US010055460B2

(12) United States Patent
O'Connor (10) Patent No.: US 10,055,460 B2
(45) Date of Patent: Aug. 21, 2018

(54) ANALYSIS OF PARALLEL PROCESSING SYSTEMS

(71) Applicant: Arm Limited, Cambridge (GB)

(72) Inventor: Mark O'Connor, Lübeck-Travemünde (DE)

(73) Assignee: Arm Limited, Cambridge, Cambridgeshire (GB)

(*) Notice: Subject to any disclaimer, the term of this patent is extended or adjusted under 35 U.S.C. 154(b) by 182 days.

(21) Appl. No.: 14/916,648

(22) PCT Filed: Sep. 3, 2014

(86) PCT No.: PCT/GB2014/052654
§ 371 (c)(1),
(2) Date: Mar. 4, 2016

(87) PCT Pub. No.: WO2015/033126
PCT Pub. Date: Mar. 12, 2015

(65) Prior Publication Data
US 2016/0203188 A1   Jul. 14, 2016

(30) Foreign Application Priority Data

Sep. 4, 2013 (GB) .................................. 1315710.2

(51) Int. Cl.
*G06F 17/30* (2006.01)
*G06F 11/32* (2006.01)
(Continued)

(52) U.S. Cl.
CPC ...... *G06F 17/30516* (2013.01); *G06F 11/323* (2013.01); *G06F 11/3452* (2013.01);
(Continued)

(58) Field of Classification Search
CPC ......... G06F 17/30595; G06F 17/30516; G06F 17/30327; G06F 11/3476; G06F 11/323;
(Continued)

(56) References Cited

U.S. PATENT DOCUMENTS 5,852,826 A    12/1998  Graunke et al.
7,219,034 B2*   5/2007  McGee ................. G06F 11/323
                                                    348/672

(Continued)

OTHER PUBLICATIONS

Bade, Ragnar, et al., "Connecting T-Oriented Data and Information to a Coherent Interactive Visualization", CHI 2004, Vienna, Austria, Apr. 24-29, 2004, CHI Letters, vol. 6, No. 1, pp. 105-112.*

(Continued)

*Primary Examiner* — Robert Stevens
(74) *Attorney, Agent, or Firm* — McDonnell Boehnen Hulbert & Berghoff LLP (57) ABSTRACT

A method of analysing streams of metric data from a plurality of data processing sources (2) in a parallel processing system (1), using a computer (6). Each stream includes time stamped data associated with the respective data processing source in respect of a given metric which is sampled at intervals. For each stream of data, a start time and an end time are identified. A normalized start time and a normalized end time are determined across all streams. Sampling points are specified between the normalized start time and the normalized end time. For each stream of data, the data is re-sampled at the specified sampling points. For each sampling point, the re-sampled data across all the streams of data is processed to determine a statistical derivative of the data. A report is displayed which represents the values of the statistical derivative as a function of time. The process may be applied to various different metrics, and the results displayed at the same time, on a common time axis.

21 Claims, 4 Drawing Sheets

(51) Int. Cl.
*G06Q 10/00* (2012.01)
*G06F 11/30* (2006.01)
*G06F 11/34* (2006.01)

(52) U.S. Cl.
CPC .... *G06F 11/3476* (2013.01); *G06F 17/30327* (2013.01); *G06F 17/30595* (2013.01); *G06Q 10/00* (2013.01); *G06F 11/3003* (2013.01); *G06F 11/3062* (2013.01); *G06F 11/3075* (2013.01); *G06F 11/3404* (2013.01); *G06F 11/3409* (2013.01); *G06F 11/3495* (2013.01); *G06F 2201/835* (2013.01)

(58) Field of Classification Search
CPC ............. G06F 11/3003; G06F 11/3452; G06F 11/3495; G06F 11/3062; G06F 11/3409; G06F 11/3404; G06F 2201/835; G06F 11/3075; G06Q 10/00
USPC ........................................................ 707/756
See application file for complete search history.

(56) References Cited

U.S. PATENT DOCUMENTS

| | | | | |
|---|---|---|---|---|
| 9,921,936 | B2* | 3/2018 | Luchi | G06F 11/3452 |
| 2002/0198985 | A1 | 12/2002 | Fraenkel et al. | |
| 2008/0297513 | A1* | 12/2008 | Greenhill | G06Q 99/00 345/440 |
| 2009/0091443 | A1* | 4/2009 | Chen | G06K 9/00536 340/540 |
| 2009/0199047 | A1 | 8/2009 | Vaitheeswaran et al. | |
| 2011/0153603 | A1 | 6/2011 | Adiba et al. | |
| 2011/0251976 | A1* | 10/2011 | Thathachar | G06F 17/16 705/36 R |
| 2014/0320502 | A1* | 10/2014 | Fletcher | G06T 11/206 345/440.2 |
| 2016/0078190 | A1* | 3/2016 | Greene | G01N 33/48 345/440 |

OTHER PUBLICATIONS

Leite, Daniel, et al., "Evolving fuzzy granular modeling from nonstationary fuzzy data streams", Evolving Systems, vol. 3, Springer-Verlag, Berlin, Germany, Feb. 18, 2012, pp. 65-79.*
Clarke, William, MD, et al., "Statistical Tools to Analyze Continuous Glucose Monitor Data", Diabetes Technology & Therapeutics, vol. 11, Supplement 1, 2009, pp. S-45 to S-54.*
McWilliams, Brian, et al., "Sparse partial least squares for on-line variable selection in multivariate data streams", Imperial College London, Dept. of Mathematics, (arXiv:0902.1323v1 [stat.ML], Cornell University Library), Feb. 8, 2009, 26 pages.*
Begole, James Bo, et al., "Work Rhythms: Analyzing Visualizations of Awareness Histories of Distributed Groups", CSCW '02, New Orleans, LA, Nov. 16-20, 2002, pp. 334-343.*
Merriam-Webster's Collegiate Dictionary, 10th Edition, Merriam-Webster, Inc., Springfield, MA, © 2000, pp. 718 and 720.*
Dasu, Tamraparni, et al., "Change (Detection) You Can Believe in: Finding Distributional Shifts in Data Streams", IDA 2009, Lyon, France, © Springer-Verlag, Aug. 31-Sep. 2, 2009, pp. 21-34.*
Kanagal, Bhargav, et al., "Online Filtering, Smoothing and Probabilistic Modeling of Streaming Data", ICDE 2008, Cancun, Mexico, Apr. 7-12, 2008, pp. 1160-1169.*
Written Opinion of the International Search Authority dated Nov. 5, 2014 for PCT/GB2014/052654 filed Sep. 3, 2014; 8 pages.
International Search Report dated Oct. 27, 2014 for PCT/GB2014/052654 filed Sep. 3, 2014; 4 pages.

* cited by examiner

ANALYSIS OF PARALLEL PROCESSING SYSTEMS

This invention relates to the analysis of parallel processing systems, used for data processing.

During the execution of a typical parallel processing system, many programs or other subsystems run in parallel, typically distributed across many different processors—which may be located in many different computers. These processors or computers typically communicate with one another or share some common resources. For each running program or subsystem, it is desirable to record and analyse various metrics at intervals of time. A metric may be any measurable scalar value, such as the current power usage of a machine, the percentage of processor capacity used by a running program, the number of writes to a database, the memory usage, input/output (IO) activity, computational activities by an application, message passing interface (MPI) activities by an application, and so forth. Typically, values of metrics will be obtained at random points within fixed time intervals.

With a large number of processors and/or computers involved, the number of data streams will be considerable and there have been various proposals for visualizing this data, These include:

A. Calculate and show statistics such as mean and variance over all or a subset of data streams and over time.
B. Show the data for individual data streams over time, using one graph per stream
C. Attempt to group similar data streams and show one or more 'typical' graphs for each group of data streams, across time.

One object of the present invention is to manipulate and analyse data from a number of streams, so that it can be presented in a more effective manner.

Viewed from one aspect, the invention provides a method for generating a report output which represents analysis of a plurality of streams of data from a plurality of data processing sources of a parallel processing system, each stream including time stamped data associated with the respective data processing source in respect of a given metric which is sampled at intervals, wherein the method includes using a data processing system to carry out the following steps for the given metric: receiving the streams of data; for each stream of data, identifying a start time and an end time; determining a normalized start time and a normalized end time; specifying sampling points between the normalized start time and the normalized end time; for each stream of data, sampling the data at the specified sampling points between the normalized start time and the normalized end time; for each sampling point analysing the sampled data across all the streams of data to determine a statistical derivative of the data; and providing a report output which represents the values of the statistical derivative as a function of time.

If there is no original value at a given specified sampling point for a particular stream, an interpolated value is calculated. The interpolation technique will depend on the metric concerned.

By means of this aspect of the invention, starting with a sequence of irregularly time stamped samples, there is created a sequence of samples in regular time "buckets". For a given metric it is possible define a plurality of sampling points at which data can be aggregated over all streams and a statistical derivative determined for each sampling point.

The method can be viewed as a process in which the streams are sampled in a first step to produce the normalised start and end times, and then re-sampled at the specified sampling points. This provides a scalable way of merging many data streams.

In some embodiments, the step of determining the normalized start time and the normalized end time end time is carried out using a tree structure in which start and end times specified for a node are determined by merging start and end times for the immediately preceding nodes in the tree structure. Thus, for example, in a binary tree structure, the start and end times specified for a node would be determined by merging start and end times for a preceding two nodes in the tree structure. However, the method is not limited to the use of a binary tree. In most embodiments of this aspect of the invention, there will be streams of data for a plurality of properties (i.e. metrics) associated with a respective data processing source, and for example there might be one stream for CPU usage, one for memory usage and so forth. All of the streams are handled in the same manner, and they can all be sampled at the same specified sampling points. Results for one property at a particular sampling point are aggregated, and results for another property are aggregated. This makes it easy to compare variations in one property as a function of time directly with variations of another property, on the same time scale.

The reports in respect of the statistical derivatives of one property as a function of time, can thus be displayed alongside the statistical derivatives of each other property as a function of time, on the same time line.

For any particular property, there may a number of statistical derivatives which can be displayed in a report. These may include, for example, minimum, maximum, mean, variance and skew. In general, the statistical derivatives may comprise two or more derivatives selected from minimum, maximum, mean, variance and skew.

In some embodiments, the statistical derivatives for the different properties are merged using a tree structure in which the value specified for a node is determined using the outputs for the immediately preceding nodes in the tree structure. Thus, for example, in a binary tree structure, the value specified for a node would be determined by merging values for a preceding two nodes in the tree structure. However, the method is not limited to the use of a binary tree.

In some embodiments there are calculated statistical variants, such as the mean, variance, min, max and skew values, for the distribution of metric values in a first quantized sample, then a second and so on. This is done in parallel across the cluster and is merged efficiently up to a collection node for logging or display. In this method, at each node in the tree statistical techniques for combining distributions are applied to the data from each of the child nodes to generate a new merged distribution which is passed to the parent. The root of the tree therefore generates one single statistically-valid distribution per time interval per metric.

The same tree structure may be used for both normalizing start and end time, and for combining report outputs. However, two different tree structures could be employed. In any event, when using a tree structure in methods in accordance with the invention, merging takes place at each node in the tree.

An advantage of the system described is that very little data must be transferred to and processed by any individual system, which eliminates bottlenecks when dealing with even highly-parallel applications with tens of thousands of data streams. The size of data transmitted to the collection node is fixed and may be configured in advance.

The same method can be used in respect of any number of different metrics in respect of the data processing sources.

Another aspect of the invention concerns the presentation of the reports of statistical derivatives as a function of time, for a particular property, on a display. In a preferred method, for any given point on the time axis, there is a there is a first point representing the maximum value for the property and a second point representing the minimum value for the property. The region between these two points represents the distribution of values. In a preferred arrangement, there is a third point representing the mean value for the property. In a preferred arrangement, the region between the first and second points is provided with variable shading, determined in accordance with distance from the mean value of values in this region. Preferably, points that are closer to the mean value are shaded more darkly than points that are farther from the mean value. The degree of shading for these points may be calculated using a probability function for the distribution given, approximating the data distribution as normal.

The various first points may be joined by a first line, representing a plot of the maximum values. The various second points may be joined by a second line, representing a plot of the minimum values. The various third points may be joined by a third line, representing a plot of the mean values.

Preferably, a plurality of reports for different properties (metrics) are displayed on the same display. These may be displayed separated from each other in a direction perpendicular to the time axis. The statistical derivatives of the different properties will share the same time axis, and in general each different property is represented by sampled values taken at the same sampling times. Thus the results for the different properties are aligned and can be compared directly. In some embodiments, selecting a point or range on the output for one property will automatically select the point or range for each other property. Thus, Interactions with the various plots are inter-linked between the properties.

The plot for one property may be displayed in a different colour from that of the plot for another property, to assist in distinguishing them.

It will be appreciated that whilst this method of displaying the results is particularly applicable to the results obtained from parallel processing streams using the method as described earlier, it is also applicable to plots of other data obtained in other manners. For example, if there are two properties the plots may be obtained separately and sampled at different time intervals, but then manipulated so that the fit on the same time line. If necessary, interpolation may be used so that at any point in time, there are correctly aligned values for all properties displayed.

Thus, viewed from another aspect, the invention provides a method of displaying for analysis, as a function of time, values of a property obtained from a number of different sources, in which there is displayed a first plot of maximum values, a second plot of minimum values and a third plot of mean values, wherein points representing values between the maximum value and the minimum value are given a shading which depends on how much they differ from the mean value.

Preferably, the points are given a darker shade the closer they are to the mean value.

Preferably there is further provided a method of displaying for analysis, as a function of time, values of a second property obtained from a number of different sources, on the same display as the values of the first property, in which there is displayed a first plot of maximum values, a second plot of minimum values and a third plot of mean values, wherein points representing values between the maximum value and the minimum value are given a shading which depends on how much they differ from the mean value. Preferably, the points are given a darker shade the closer they are to the mean value.

Preferably there is a common time scale for the display of the values for the first property and of the values for the second property. Preferably the values for the first and second properties are aligned in time. Preferably, the displays of the values for the first property and of the values for the second property are separated in a direction which is perpendicular to the time axis.

An advantage of displaying data in this manner is that areas of time in which a particular metric has high variance across data streams show up as large coloured areas of the graph—this is beneficial as high variance typically indicates one or more problems in many real-world parallel environments.

The entire time sequence of the program can be seen at a glance—many programs proceed through a series of different stages; taking an average over time blurs these and produces difficult-to-interpret results. The described method allows the structure and behaviour of the program over time to be clearly identified and analyzed.

For each quantized moment in time, the user can interactively examine the labels of the data streams responsible for outlying (min and max) values, which is often of interest when looking at performance problems or unusual patterns of activity.

Combining multiple metrics in this manner is an extremely powerful way of visually representing the state of a variety of subsystems over extremely large numbers of subsystems in a single display.

The invention also extends to a computer software product containing instruction for configuring data processing apparatus to carry out the methods of the various aspects of the invention. This may be a tangible product such as a DVD, computer memory or other storage device. It may also be an intangible product such as a program supplied from a remote location over a communications network. The invention also extends to data processing apparatus configured to carry out the methods. The invention also extends to such data processing apparatus in combination with a parallel processing system as such.

There will now be described by way of example some embodiments of the invention, and with reference to the accompanying drawings in which.

Figure 1:
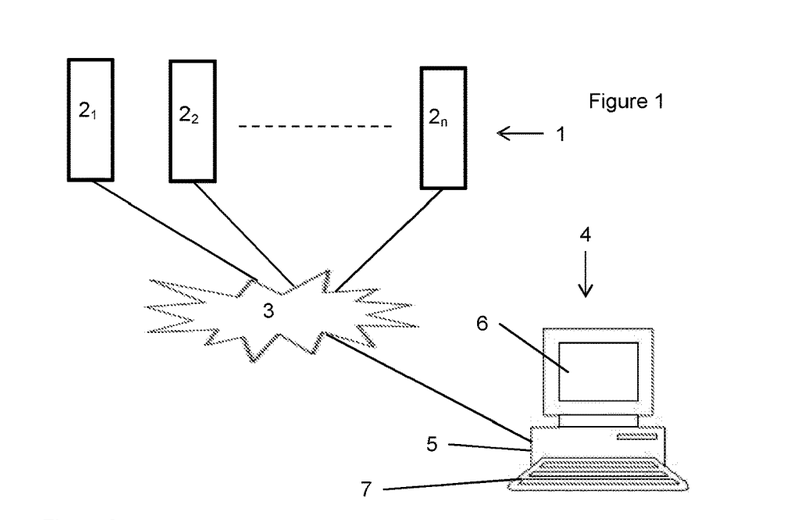
FIG. 1 shows a parallel processing system in which a plurality of computers are interconnected.
Figure 2:
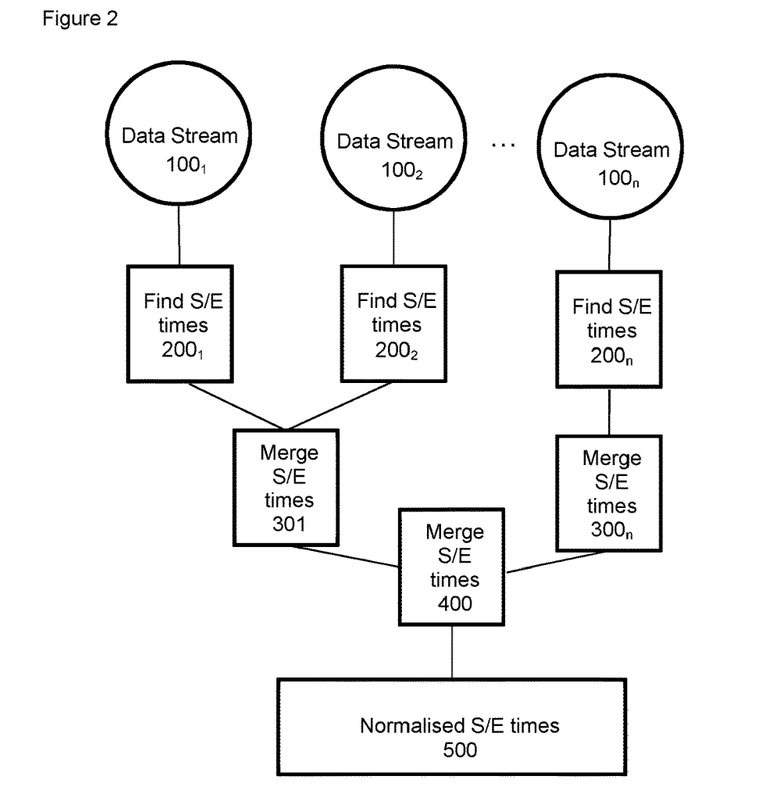
FIG. 2 is a diagram showing how the data is normalized.

Referring now in detail to the drawings, FIG. 1 shows a parallel processing system 1, comprising a plurality of computers $2_1$ to $2_n$. each of which has a processor running a number of routines, including the production of streams of data about computer performance. Each computer will have other standard components such as RAM, ROM and a storage device which may be solid state and/or a hard drive. The processors each produces an irregular, time-stamped sequence of values for each metric on each stream of data. The streams of data are transmitted via a network 3 to a monitoring computer 4 with a processing unit 5, a display 6 on which results are displayed, and an input device such as a keyboard 7. The streams of data in respect of a particular metric, provided by computers $2_1$ to $2_n$, processed as shown in FIG. 2. Each computer $2_1$ to $2_n$ produces a corresponding stream $100_1$ to $100_n$.

First, the system quantizes the irregular samples into a new sequence of values at regular intervals synchronized across all data streams. To do this, a scalable tree structure is used to merge the start and end times of each sequence over all processes, to calculate normalised start and end times. As shown in FIG. 2, there is a binary tree but other trees are possible. At step $200_1$ the start and end times are found for stream $100_1$. Similarly, at step $200_2$ the start and end times are found for stream $100_2$. This repeated up to step $200_n$ for stream $100_n$. The start and end times are then merged down the tree as indicated diagrammatically at steps 301 to $300_n$ and step 400 to produce the normalised start and end times at 500.

A simple example will be worked through with four streams of data. Each stream is a sequence of time-stamped samples (values). A, B and C will be used to represent discrete data points sampled at various times. These could, for example, correspond to a unique stack trace in a program, or the value of a performance counter. Before normalization, there may be the following:

| Stream | Sample 1 | Sample 2 | Sample 3 | Sample 4 |
|---|---|---|---|---|
| 1 | t = 1, A | t = 2, A | t = 3, B | t = 4, B |
| 2 | t = 1, A | t = 3, B | | |
| 3 | t = 2, A | t = 4, B | t = 5, B | |
| 4 | t = 1, C | t = 2, C | t = 3, C | t = 6, B |

In order to be able to merge these streams efficiently and scalably against the number of streams it is desired to ensure that the number of samples is independent of the number of streams and that the sampled data can be meaningfully aggregated at each step. To do this, the sampling intervals are normalized.

Step 1: Merge the smallest start time and largest end time up the tree, taking the minimum/maximum of each respectively at each node.

Node numbering is as follows: N12 is the parent of streams 1 and 2, N1234 is the parent of streams from N12 and N34.

N12: $T_{start}$=min(1, 1), $T_{end}$=max(4, 3)

N34: $T_{start}$=min(1, 2), $T_{end}$=max(5, 6)

N1234: $T_{start}$=min(1, 1), $T_{end}$=max(4, 6)

Thus, the normalised start and end times in this simple example are respectively 1 and 6.

These values are sent back down the tree to all nodes, along with the number of normalized samples it is wished to visualize over this range. If it is desired to show just three samples in this example (the number of samples recorded should typically be larger than the number to be visualized in order to maximize the information density available to the user): $T_{start}$=1, $T_{end}$=6, Samples Required=3

Now each node can, in parallel, resample its own data into 3 equally-spaced buckets:

| Stream | t = 0-2 | t = 3-4 | t = 5-6 |
|---|---|---|---|
| 1 | A | B | — |
| 2 | A | B | — |
| 3 | A | B | B |
| 4 | C | C | B |

This can be efficiently merged using the strategies outlined in this patent application. For numerical A, B, C at each of N12, N34, N1234 the statistical distribution and stream label contributing to min/max values can be efficiently merged from its children. For labelled data such as program locations, a counted set can be computed, e.g. at t=0-2 there is {A:3, C:1}—the size of this data structure depends on the number of labels and not on the number of streams.

Figure 3:
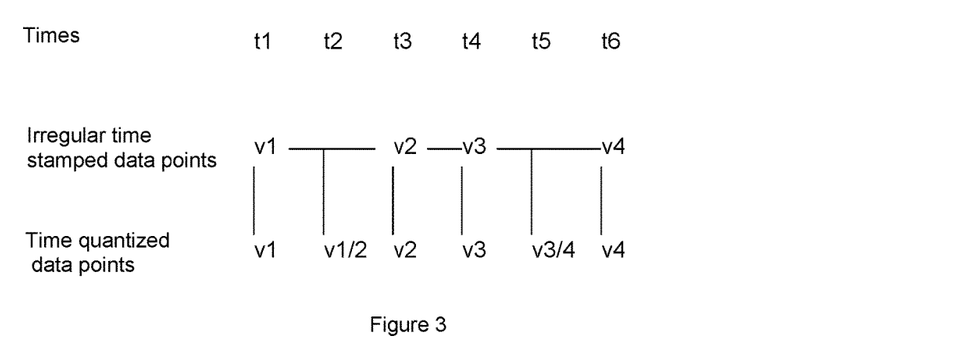
FIG. 3 is a diagram showing how streams are re-sampled.

FIG. 3 shows regularly spaced time points t1 to t6. In a particular case, irregular time stamped data points which have been measured are v1, v2, v3 and v4. The time quantized data points are shown in the bottom line of FIG. 3. At t2 there is no measured value but instead an interpolated value v1/2 is used. This could be an intermediate value or just a repetition of the last value v1. Similarly, at t5 there is no measured value but instead an interpolated value v3/4 is used. This could be an intermediate value or just a repetition of the last value v3.

In this arrangement, normalised start and end times are distributed back down to each node, i.e. broadcast these back down the tree so that all nodes have the same $T_{start}$ and $T_{end}$, along with a desired number of quantized intervals. These are then used to effectively re-sample the data stream at regular points, as described above with reference to FIG. 3 with varying functions used to interpolate between original values depending on the metric being measured.

Figure 4:
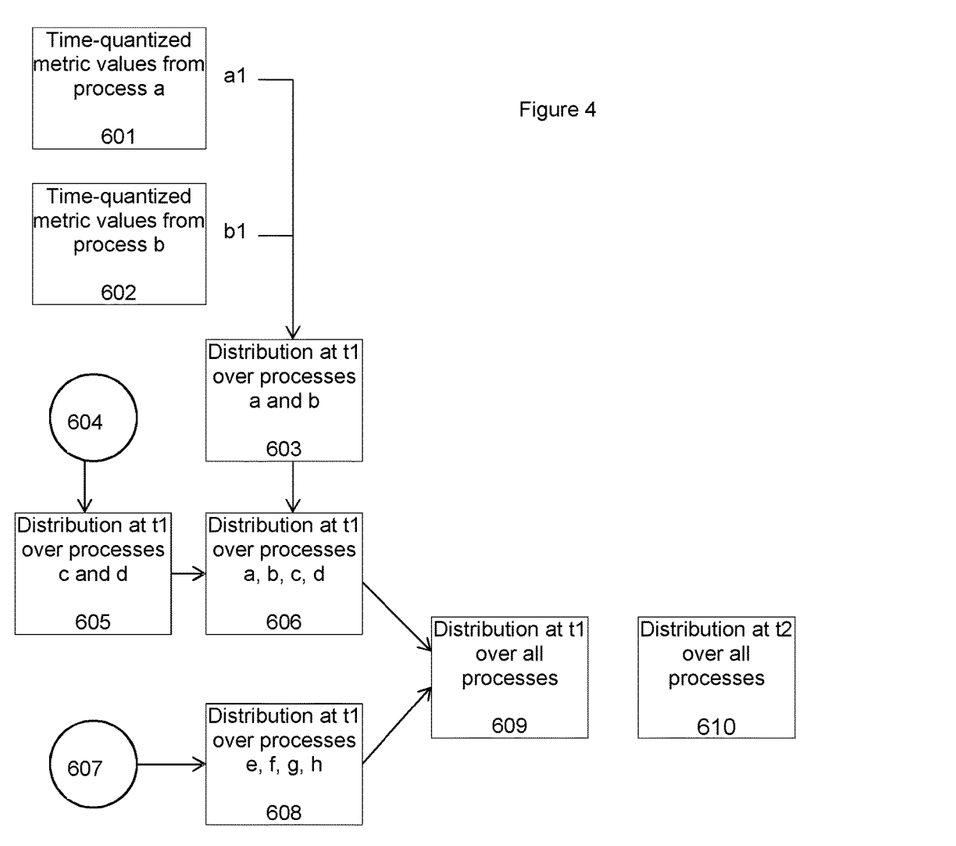
FIG. 4 is a diagram showing how distributions are obtained.

The next step is to calculate distribution characteristics in parallel, as shown schematically in FIG. 4. The system efficiently calculates the mean, variance, min, max and skew values for the distribution of metric values in the first quantized sample, then the second and so on. This is done in parallel across the cluster and is merged efficiently up to a collection node for logging or display. In this method, at each node in the tree well-known statistical techniques for combining distributions are applied to the data from each of the child nodes to generate a new merged distribution which is passed to the parent. The root of the tree therefore generates one single statistically-valid distribution per time interval per metric.

Thus, at 601 and 602, there are time quantized metric values a1 and b1 from process a and process b respectively. At 603, there is calculated the distribution at t1 over processes a and b. By a corresponding technique 604, at 605 there is calculated the distribution at t1 over processes c and d. at 606 there is calculated the distribution at t1 over processes a, b, c, d. Similarly, by a corresponding set of procedures 607, at 608 there is calculated the distribution at t1 over processes e, f, g, h. Finally, at 609 there is calculated the distribution at t1 over all processes. The same is repeated at t2, and at all remaining times.

Figure 5:
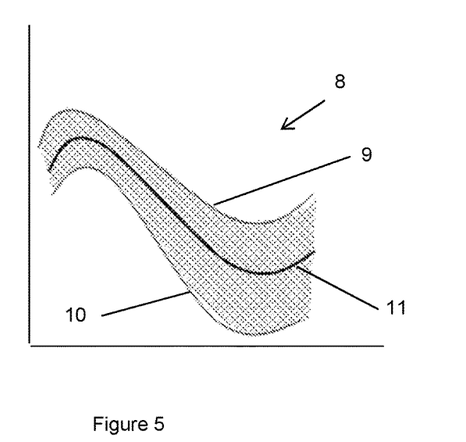
FIG. 5 shows in detail how a display of a property is constructed.

The next step is to transform time-based sequences of distributions for display. At the front end for each metric there is now a single time-based sequence of distributions of metric value across many data streams (in high performance computing, HPC, typically processes), which may be represented by many distribution models. Typically the min, max, mean, variance and skew are used. Each such sequence is converted for display on its own graph, with time as the x axis and metric value as the y axis. For each point along the x axis there is a distribution (characterized by the mean, variance, min and max) that are plotted instead of a single pixel. The min, max and mean values are drawn as solid points, and the points between the min and max shaded according to their distance from the mean, with closer points being shaded more darkly and outer points more lightly. The shaded value of each point is calculated using the probability distribution function for the distribution given, approximating the data distribution as normal.

Part of the display for a single metric is shown in FIG. 5, where a plot 8 comprises a maximum line 8, a minimum line 10 and a mean line 11. The region between the maximum and minimum lines is shaded as described above.

Figure 6:
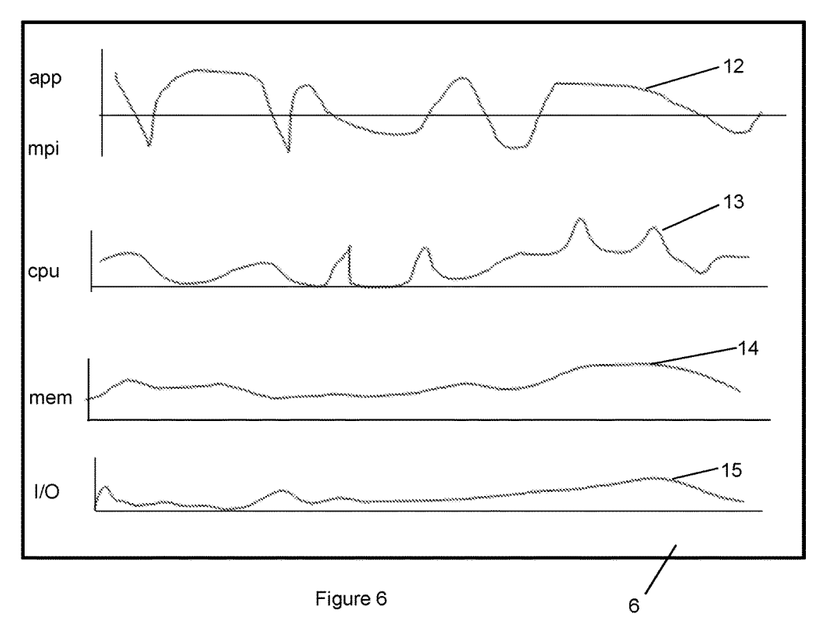
FIG. 6; shows how results for a number of properties are displayed.

The next step is the combination of multiple metrics. As all metrics are now represented as evenly-spaced samples across a fixed period of time, the horizontal time axis of each graph is linked together. As shown in FIG. 6, there are graphs 12, 13, 14 and 15. In this case, graph 12 shows computational activity of an application (app) above the x axis and sending or transmitting activity through a Message Passing Interface (mpi) below the x axis. Graph 13 shows processor activity (cpu), graph 14 shows memory usage (mem) and graph 15 shows input/output activity (I/O). The graphs are stacked vertically over a common horizontal time axis, such that events of interest in, say, the CPU graph are lined up with I/O or memory behaviours occurring at the same point in time. All interactions with the graphs are also linked, such that selecting a point or range of time in one graph also highlights and selects the same point or range in the others.

Figure 7:
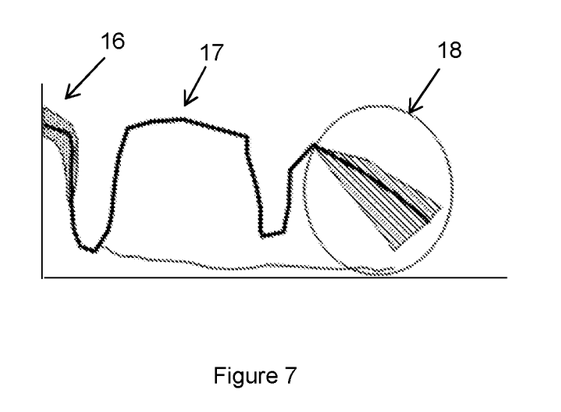
FIG. 7 shows in detail some regions of how events appear in the display of a property.

FIG. 7 shows a graph in more detail, with an example of how events are displayed—in this case for CPU loads. Region 16 shows an event where all CPUs are under high load, with the maximum, minimum and mean close together. Region 17 shows an event where all but one CPU are under high load, with the maximum and mean close together, but with a low minimum representing the one CPU that is idle. Region 18 shows a similar scenario with one CPU idle, but now illustrating that there is high variance because the others are changing out of synchronisation.

The invention thus provides an improved method of analysing streams of metric data from computers in a parallel processing system and an improved method of displaying the results.

Viewed from another aspect, the invention provides a method for generating a report output which represents analysis of a plurality of streams of data from a plurality of data processing sources of a parallel processing system, each stream including time stamped data in respect of a property associated with a respective data processing source which is sampled at intervals, wherein the method includes using a data processing system to carry out the following steps: receiving the streams of data; for each stream of data, identifying a start time and an end time; determining a normalized start time and a normalized end time; specifying sampling points between the normalized start time and the normalized end time; for each stream of data, sampling the data at the specified sampling points between the normalized start time and the normalized end time; for each sampling point analysing the sampled data across all the streams of data to determine a statistical derivative of the data; and providing a report output which represents the values of the statistical derivative as a function of time. In embodiments of the invention as described, effectively the process of normalisation identifies the earliest start time and the latest end time, across all streams of data. In a tree structure, merging start and end time for two nodes may consist of identifying the earliest start time (i.e. minimum) in the two nodes, and the latest end time (i.e. maximum) in the two nodes.

The invention may also be expressed as a method of analysing streams of metric data from a plurality of data processing sources in a parallel processing system using a computer. Each stream includes time stamped data associated with the respective data processing source in respect of a given metric which is sampled at intervals. For each stream of data, a start time and an end time are identified. A normalized start time and a normalized end time are determined across all streams. Sampling points are specified between the normalized start time and the normalized end time. For each stream of data, the data is re-sampled at the specified sampling points. For each sampling point, the re-sampled data across all the streams of data is processed to determine a statistical derivative of the data. A report is displayed which represents the values of the statistical derivative as a function of time.

The process of the invention may be applied to various different metrics, and the results displayed at the same time, using a common time scale.

The invention claimed is:

1. A method for generating a report output in respect of a given metric, the method comprising using a data processing system to carry out the following steps for the given metric:
receiving a plurality of streams of data from a plurality of data processing sources of a parallel processing system, each stream including time-stamped data, associated with a respective data processing source of the plurality of data processing sources, in respect of the given metric which is sampled at intervals;
for each stream of data, identifying a respective start time and a respective end time;
determining a normalized start time and a normalized end time;
specifying normalized sampling points between the normalized start time and the normalized end time;
for each stream of data, re-sampling the data at the specified normalized sampling points between the normalized start time and the normalized end time, thereby producing normalized sampled data;
for each normalized sampling point, using a statistical-analysis tree structure to analyze the normalized sampled data across all the streams of data to determine one or more statistical derivatives of the normalized sampled data, the statistical-analysis tree structure having nodes, wherein, for each node in the statistical-analysis tree structure that has one or more immediately-preceding nodes, values for the one or more immediately-preceding nodes are used to determine a value for said node; and
providing a report output which represents values of the one or more statistical derivatives as a function of time.

2. The method of claim 1, wherein the statistical-analysis tree structure is a binary tree structure.

3. The method of claim 1, wherein when there is no data at a specified normalized sampling point for a particular stream of data, an interpolated value is calculated from the stream of data.

4. The method of claim 1, wherein the one or more statistical derivatives comprise two or more derivatives selected from minimum, maximum, mean, variance and skew.

5. The method of claim 4, comprising calculating the two or more statistical derivatives in parallel and merging the statistical derivatives using the statistical-analysis tree structure.

6. The method of claim 4, wherein the statistical derivatives include maximum and minimum, the method further comprising displaying a presentation of the report output of the statistical derivatives as a function of time along a time axis, wherein for each point on the time axis, there is a respective first point representing a maximum value for the metric and a respective second point representing a minimum value for the metric.

7. The method of claim 6, wherein, for each point on the time axis, there is a respective third point representing a mean value for the metric.

8. The method of claim 7, wherein, for each point on the time axis, a region between the first and second points is provided with variable shading, determined in accordance with distance from the mean value of values in this region.

9. The method of claim 8, wherein points in the region between the first and second points that are closer to the mean value are shaded more darkly than points that are farther from the mean value.

10. The method of claim 9, wherein the degree of shading is calculated using a probability function for a given distribution.

11. The method of claim 7, wherein the respective first points for each point on the time axis are joined by a first line, representing a plot of the maximum values; the respective second points for each point on the time axis are joined by a second line, representing a plot of the minimum values; and the respective third points for each point on the time axis are joined by a third line, representing a plot of the mean values.

12. The method of claim 1, wherein, for each normalized sampling point, a statistically-valid distribution is generated for a root node of the respective statistical-analysis tree structure.

13. The method of claim 12, wherein each said statistically-valid distribution is characterized by a respective mean value, a respective variance value, a respective minimum value and a respective maximum value.

14. The method of claim 1, wherein each stream of data from the plurality of streams of data is associated with a respective label, and wherein the one or more statistical derivatives includes minimum or maximum, the method further comprising, for each normalized sampling point, using the statistical-analysis tree structure to merge the labels of the plurality of streams of data to determine the label of a stream of data from the plurality of streams of data that has a minimum value across the streams of data, at the normalized sampling point, or to determine the label of a stream of data from the plurality of streams of data that has a maximum value across the streams of data, at the normalized sampling point.

15. The method of claim 1, comprising carrying out the step of determining the normalized start time and the normalized end time using a time-merging tree structure having nodes, in which, for each node in the time-merging tree structure that has one or more immediately-preceding nodes, a start time and an end time are determined for the node by merging start and end times for the one or more immediately preceding nodes.

16. The method of claim 15, wherein the statistical-analysis tree structure and the time-merging tree structure are the same tree structure.

17. The method of claim 1, wherein there are a plurality of streams of data, each including time-stamped data in respect of a plurality of different metrics, associated with each respective data processing source, and the method is repeated for each different metric.

18. The method of claim 17, wherein for each metric there is produced a report output which represents values of a plurality of statistical derivatives as a function of time.

19. The method of claim 18, comprising displaying the report outputs for the different metrics on a common time line.

20. The method of claim 1, comprising logging or displaying the report output.

21. A non-transitory computer-readable medium containing instructions for configuring a data-processing system to generate a report output in respect of a given metric by carrying out the following steps for the given metric:
  receiving a plurality of streams of data from a plurality of data processing sources of a parallel processing system, each stream including time-stamped data, associated with a respective data processing source of the plurality of data processing sources, in respect of the given metric which is sampled at intervals;
  for each stream of data, identifying a respective start time and a respective end time;
  determining a normalized start time and a normalized end time;
  specifying normalized sampling points between the normalized start time and the normalized end time;
  for each stream of data, re-sampling the data at the specified normalized sampling points between the normalized start time and the normalized end time, thereby producing normalized sampled data;
  for each normalized sampling point, using a statistical-analysis tree structure to analyze the normalized sampled data across all the streams of data to determine one or more statistical derivatives of the normalized sampled data, the statistical-analysis tree structure having nodes, wherein, for each node in the statistical-analysis tree structure that has one or more immediately-preceding nodes, values for the one or more immediately-preceding nodes are used to determine a value for said node; and
  providing a report output which represents values of the one or more statistical derivatives as a function of time.

* * * * *